April 21, 1936.    A. G. REDMOND    2,038,446
ELECTRIC MOTOR
Filed Dec. 19, 1934
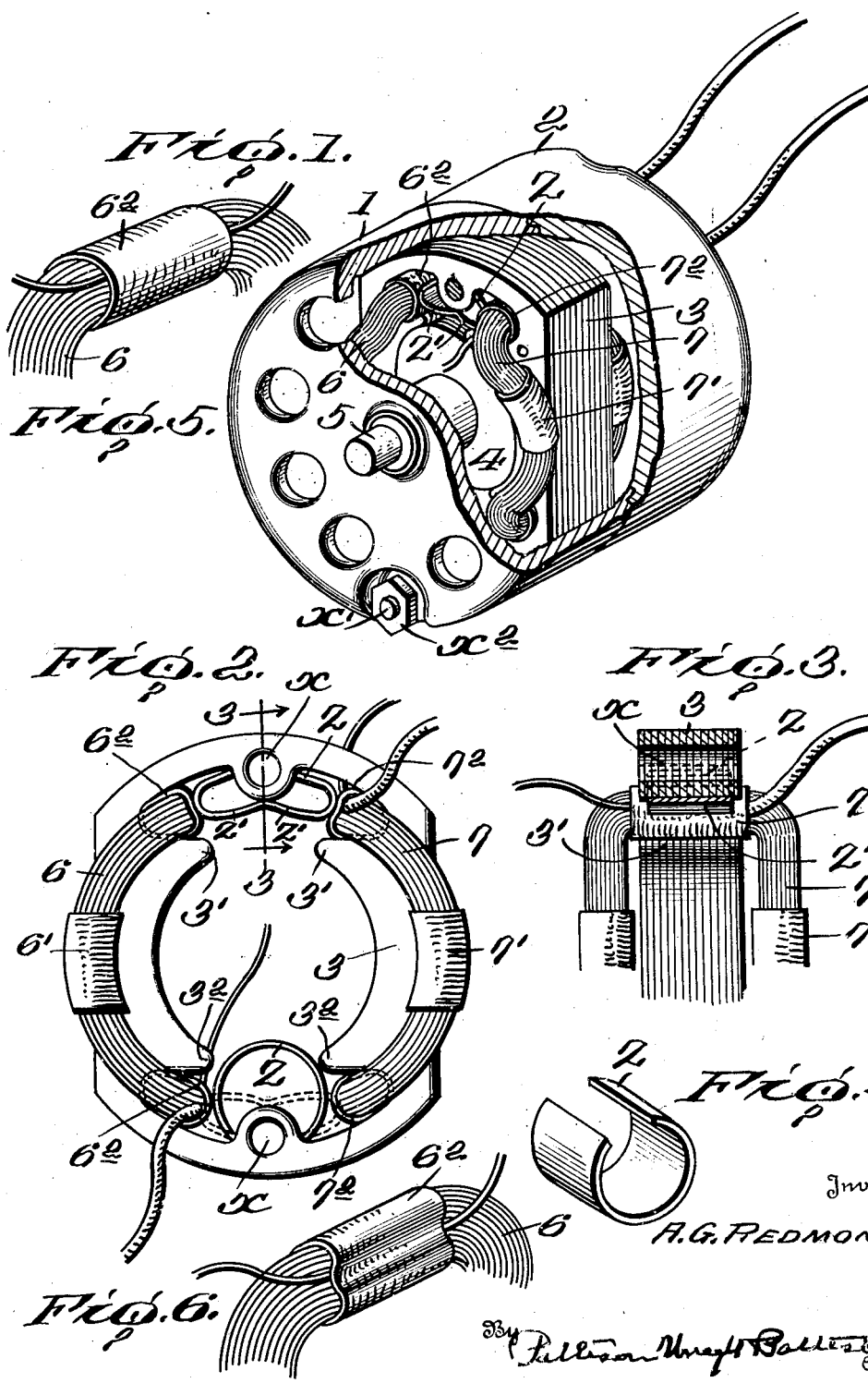

Patented Apr. 21, 1936

2,038,446

UNITED STATES PATENT OFFICE 2,038,446

ELECTRIC MOTOR

Albert Green Redmond, Flint, Mich.

Application December 19, 1934, Serial No. 758,329

11 Claims. (Cl. 172—36)

This invention relates to certain new and useful improvements in electric motors, and more particularly to means for securing the field coils in position on the stator, the object being to provide a construction which eliminates coil taping, grounding and tying, and provides means for securing the field coils more rigidly in position, in such a manner that both coils are clamped equally and at the same time the lead wires are anchored for about one-half the former cost of positioning the field coils.

Another object of my invention is to provide an electric motor in which the stator is provided with seats to receive the field coils, two seats being provided for each coil, and the opposite disposed field coils being rigidly secured in their respective seats by a collapsible member which expands when collapsed, so as to force and position the coils in their seats, and at the same time, the lead wires of the coils are anchored by the expansion of said member.

Another object of my invention is to provide a clamping member in the form of a split ring, which is adapted to embrace the boss of the stator, so that when said split ring is collapsed by an expanding tool, the opposite disposed loops formed thereby will engage the field coils equally and at the same time, anchor the lead wires of the coils.

Other useful objects and advantages of the invention will be hereinafter set forth and the novel features thereof defined by the appended claims.

In the drawing,

Figure 1 is a perspective view of a motor showing the casing broken away, with my improved construction of means for clamping the field coils in position;

Figure 2 is an elevation of the stator removed, showing the coils at one end in position to be secured by a split ring, and at the opposite end secured by the ring after it has been collapsed or expanded into engaging with the ends of the coils;

Figure 3 is a vertical section taken on line 3—3 of Figure 2;

Figure 4 is a perspective view of one of the clamping rings;

Figure 5 is a detail perspective view, partly broken away, of a field coil showing the lead wires secured by a tape; and Figure 6 is a detail perspective view partly broken away, showing the coil moved into the position that it assumes by the pressure of the ring in clamping it into position on the stator.

In the drawing 1 and 2 indicate sections of a casing in which is arranged a laminated stator 3, in which is revolubly mounted a rotor 4 provided with the usual armature winding, said rotor being carried by a shaft 5 mounted in suitable bearings of the casing.

The particular construction of rotor and its winding forms no part of my invention, as my invention consists in the means for securing the field coils in position on the stator.

The stator is provided with outwardly projecting poles $3'$, and $3^2$, forming seats in which are arranged field coils 6 and 7, herein shown provided with taped portions $6'$ and $7'$, and it will be noted that the entire coil is not taped as is the custom in constructing motors of this type which are now in use, whereby I am able to save the expense of completely taping the field coils.

The loop portions of the field coils 6 and 7 are taped as shown in $6^2$, $7^2$, within the seats formed by the poles of the stator. The stator between the field coils is provided with apertured lugs through which bolts $X'$ are adapted to extend on which are mounted nuts $X^2$ for securing the sections 1 and 2 of the casing together and the stator in position, although, the particular construction forms no part of my invention.

The lead wires of the field coils extend outwardly in opposite directions as shown in Figures 5 and 6 under the tapes $6^2$, $7^2$, and this portion of the field coils are adapted to be engaged by clamping members Z in the form of split rings as clearly shown in Figure 4, which when inserted, are inserted over the apertured lugs X as shown at the bottom of Figure 2, and an expanding tool is placed between the opposite disposed split rings Z so as to collapse the rings and expand the loop portions $Z'$ as clearly shown in the upper portion of Figures 1 and 2, whereby the field coils are forced into position within the seats of the stator, so as to thoroughly clamp these coils equally on the stator, and at the same time, anchor the lead wires of the coils, whereby I am able to manufacture an electric motor very cheaply, as I dispense with the entire taping of the field coils and tying the same in position, as in one operation the opposite disposed split rings are expanded in such a manner that they are locked over the lugs X with the loop portions $Z'$ expanded outwardly so that they force the coils into position within their seats, whereby the coils are thoroughly clamped and the lead wires are anchored without any danger of injuring the same in any way.

The split rings Z are formed of a material which will allow the rings to be bent into the position as shown in the upper portions of Figures 1 and 2 by any suitable expanding tool, and when so bent or collapsed, they will be expanded and maintained in a rigid position so as to rigidly clamp the field coils in their respective seats.

By forming the split rings Z of a predetermined size, they are all expanded equally by the expanding tool, as the distance that the rings can be collapsed are limited by the lugs X, and a very simple and cheap construction is provided which saves the expense of taping and tying the coils in position, and eliminates all danger of grounding, and provides a very durable construction of motor in which the field coils are rigidly anchored in position on the stator, and thereby all danger of becoming displaced when in use is prevented.

While I have shown a particular construction of split ring for securing the loops of the field coils in position within their seats, I do not wish to limit myself to any particular construction of split rings, as my invention consists broadly in anchoring lead wires and field coils in their proper position by a collapsible member which is collapsed by a suitable expanding tool placed between the opposite disposed split rings and expanded, and while I have failed to disclose a tool for this purpose, it will be apparent that various forms of tools could be used to accomplish this result.

From the foregoing description, it will be seen that I have provided an electric motor of the conventional type, with field coils secured in position in a novel manner by a collapsible member which performs a double function, namely that of rigidly clamping both coils equally and anchoring the lead wires at the same time enabling the coils to be properly positioned on the stator.

It will be apparent from the above description that I have provided a new method of rigidly securing field coils in position on a stator by the use of collapsible members, which when collapsed expand to properly position and maintain the field coils in their respective position, the collapsible member being bent into such a position that they become rigid to prevent the same from yielding in any way in order to hold the field coils rigid in their seats.

What I claim is:

1. An electric motor provided with a stator having seats, field coils disposed in said seats and collapsible members for rigidly holding said coils in said seats.

2. An electric motor provided with a stator having opposite disposed seats, field coils disposed in said seats, and a member disposed between said seats and adapted to be expanded into engagement with said field coils for rigidly locking the coils in said seats and anchoring the lead wires of the coils.

3. An electric motor provided with a stator having opposite disposed seats, field coils disposed in said seats, lugs disposed between said seats, a split ring adapted to embrace said lug, said ring being adapted to be collapsed and to expand into engagement with the field coils to force and rigidly secure said coils in their seats.

4. An electric motor having a stator provided with opposite disposed seats, field coils disposed in said seats and collapsible members for engaging the field coils when collapsed for positioning and rigidly securing the field coils in their respective seats.

5. An electric motor provided with a stator, field coils disposed in said stator, and non-resilient expansible members for rigidly securing said coils in position in said stator.

6. An electric motor provided with a stator, field coils disposed in said stator provided with lead wires and non-resilient expansible members for securing said lead wires in said coils, and rigidly holding said coils in position in said stator.

7. A method of securing field coils on oppositely disposed poles of a stator consisting in placing coils in position on the poles of the stator, placing collapsible members between the free ends of the poles to temporarily hold the coils thereon and then simultaneously collapsing said members into engagement with the ends of the coils for equally clamping said coils in position on the poles of said stator.

8. A method of securing field coils in position on stators having oppositely disposed poles provided with seats to receive coils consisting first in placing coils in said seats, positioning collapsible members on said stator between the ends of said poles to temporarily hold said coils in position and then simultaneously collapsing the oppositely disposed collapsible members to expand said collapsible members into engagement with the coils for forcing the coils into their seats and rigidly securing said coils in their seats and anchoring the lead wires of said coils.

9. A method of securing coils on poles of a stator consisting in first placing field coils in position on said poles, second placing expansible members between said poles to temporarily hold the coils in position on said poles and then simultaneously expanding said expansible members into engagement with the coils for permanently securing said coils in position on said poles.

10. The method of simultaneously securing field coils in position on the poles of a stator and anchoring the lead wires thereof, consisting in first placing field coils loosely in position on the poles of the stator, second placing expansible members in position to loosely hold said coils on the poles of said stator and then expanding said expansible members into engagement with said coils to permanently clamp the lead wires in said coils and the coils in position on the poles of said stator.

11. A method of securing field coils in a stator having oppositely disposed poles provided with seats and lugs disposed between the opposite ends of said poles consisting in first placing field coils loosely in position in the seats of said poles, second placing expansible members on said lugs to temporarily hold the coils in position on said poles and then simultaneously expanding said members into engagement with said coils for permanently securing said coils in position on said poles.

ALBERT GREEN REDMOND.